(12) United States Patent
Huang et al.

(10) Patent No.: US 11,836,224 B2
(45) Date of Patent: Dec. 5, 2023

(54) CROSS-MODALITY PERSON RE-IDENTIFICATION METHOD BASED ON LOCAL INFORMATION LEARNING

(71) Applicant: TONGJI UNIVERSITY, Shanghai (CN)

(72) Inventors: Deshuang Huang, Shanghai (CN); Yong Wu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 227 days.

(21) Appl. No.: 17/411,007

(22) Filed: Aug. 24, 2021

(65) Prior Publication Data

US 2022/0180132 A1 Jun. 9, 2022

(30) Foreign Application Priority Data

Dec. 9, 2020 (CN) .......................... 202011426416.1

(51) Int. Cl.
*G06K 9/62* (2022.01)
*G06F 18/25* (2023.01)
(Continued)

(52) U.S. Cl.
CPC ............. *G06F 18/256* (2023.01); *G06N 3/08* (2013.01); *G06T 5/20* (2013.01); *G06T 5/50* (2013.01); *G06T 7/73* (2017.01); *G06V 10/7515* (2022.01); *G06T 2207/10024* (2013.01); *G06T 2207/10048* (2013.01); *G06T 2207/20081* (2013.01); *G06T 2207/20084* (2013.01)

(58) Field of Classification Search
CPC ........ G06F 18/256; G06N 3/08; G06N 3/045; G06T 5/20; G06T 5/50; G06T 7/73; G06T 2207/10024; G06T 2207/10048; G06T 2207/20081; G06T 2207/20084; G06V 10/7515; G06V 10/803; G06V 10/82; G06V 40/103; G06V 20/52
See application file for complete search history.

(56) References Cited

FOREIGN PATENT DOCUMENTS

| CN | 109344787 A | * | 2/2019 | ......... G06K 9/00228 |
| CN | 111008618 A | * | 4/2020 | ......... G06K 9/00342 |

OTHER PUBLICATIONS

Xiang et al., "Cross-Modality Person Re-ID Based On Dual-Path Multi-Branch Network", pub. Dec. 1, 2019 (Year: 2019).*

* cited by examiner

*Primary Examiner* — Mekonen T Bekele
(74) *Attorney, Agent, or Firm* — JCIP GLOBAL INC.

(57) ABSTRACT

Disclosed is a cross-modality person re-identification method based on local information learning, the method comprising the following steps: acquiring a standard data set and performing data enhancement on the standard data set; dividing the enhanced standard data set into a training set and a test set; constructing a cross-modality person re-identification training network based on a dual-stream ResNet50 convolutional neural network architecture; inputting the training set into the cross-modality person re-identification training network to obtain a cross-modality person re-identification test network through training; randomly selecting an image to be queried from the test set, and inputting the image to be queried and a candidate database from the test set into the cross-modality person re-identification test network to obtain an identification accuracy value corresponding to the image to be queried.

10 Claims, 4 Drawing Sheets

(51) Int. Cl.
*G06T 7/73* (2017.01)
*G06V 10/75* (2022.01)
*G06N 3/08* (2023.01)
*G06T 5/20* (2006.01)
*G06T 5/50* (2006.01)

CROSS-MODALITY PERSON RE-IDENTIFICATION METHOD BASED ON LOCAL INFORMATION LEARNING

CROSS-REFERENCE TO RELATED APPLICATION

This application claims the priority benefit of China application serial no. 202011426416.1, filed on Dec. 9, 2020. The entirety of the above-mentioned patent application is hereby incorporated by reference herein and made a part of this specification.

BACKGROUND

Technical Field

The present invention relates to the technical field of computer pattern identification image processing, in particular to a cross-modality person re-identification method based on local information learning.

Description of Related Art

Person re-identification (PReID) is an image retrieval technology that uses computer vision and metric learning to judge whether a specific person appears under a cross-camera in an image or video sequence. As this technology can play an important role in intelligent visual surveillance and crime prevention applications, it has been widely concerned. With the rise of deep learning technology, person re-identification technology has achieved high identification accuracy under certain limited conditions, but it still faces some problems such as different viewing angles, different postures, occlusion, illumination conditions, background interference and so on.

Most of the existing person re-identification technologies are based on the same type of RGB data captured by visible light cameras. However, in real life, visible light cameras can't get the appearance features of persons in indoor environment with limited conditions or dark night with insufficient light, resulting in low accuracy of identification results. Therefore, there are studies on cross-modality person re-identification by combining visible light cameras with infrared cameras. Different from single-modality person re-identification technology, visible light-infrared cross-modality person re-identification technology not only has problems such as changes in viewing angles and posture, but also faces huge differences caused by the imaging characteristics of images of the two modalities, because visible light cameras shoot RGB images, while infrared cameras shoot infrared images. RGB images have three channels containing color information, without infrared features of persons; however, the infrared image data has only one channel, without important features such as color, and the wavelength ranges of the images of the two modalities are different, which makes the cross-modality person re-identification more difficult.

SUMMARY

To overcome the defects in the prior art, the object of the present invention is to provide a cross-modality person re-identification method based on local information learning, and improve the identification accuracy of person re-identification by effectively extracting specific features and shared features between images of different modalities.

The object of the present invention can be achieved by the following technical scheme: a cross-modality person re-identification method based on local information learning, comprising the following steps.

S1: A standard data set is acquired and data enhancement is performed on the standard data set, wherein the standard data set contains a plurality of person categorical data, each comprising a plurality of RGB images and a plurality of infrared images.

S2: The enhanced standard data set is divided into a training set and a test set.

S3: A cross-modality person re-identification training network is constructed based on a dual-stream ResNet50 convolutional neural network architecture, wherein the cross-modality person re-identification training network comprises a self-attention learning module, a local feature joint learning module and a loss function training module that are sequentially connected.

S4: The training set is inputted into the cross-modality person re-identification training network to obtain a cross-modality person re-identification test network through training.

S5: An image to be queried is randomly selected from the test set, and the image to be queried and a candidate database from the test set are inputted into the cross-modality person re-identification test network to obtain an identification accuracy value corresponding to the image to be queried.

Further, in the cross-modality person re-identification method based on local information learning, the data enhancement in the step S1 is specifically performing horizontally flipping and randomly cropping on an image sequentially.

Further, the step S3 comprises the following steps.

S31: The self-attention learning module is embedded in outputs of a second stage and a third stage of the dual-stream ResNet50 convolutional neural network architecture, wherein the self-attention learning module is used for extracting the position information of the RGB images and the infrared images and capturing local detail features, so as to enhance the specific feature expression of the RGB images and the infrared images respectively.

S32: Outputs of the third stage and a fourth stage of the dual-stream ResNet50 convolutional neural network architecture are connected to the local feature joint learning module, wherein the local feature joint learning module is used for further capturing the local detail features of the RGB images and the infrared images, so as to perform middle-level and high-level local feature splicing to obtain a local feature splicing block.

S33: The local feature joint learning module is connected to the loss function training module to train and learn the local feature splicing block with the loss function training module, so as to enhance the shared feature expression of the RGB images and the infrared images, thereby building the cross-modality person re-identification training network.

Further, the self-attention learning module comprises a dilated convolution unit, a channel rearrangement unit and a batch normalization processing unit.

Further, the specific feature expression of the self-attention learning module is as follows:

$$F_1 = Fla(D_1(X)),$$

$$F_2 = Fla(D_2(X)),$$

$F_3 = Per(F_2)$, $S = F_3 \otimes F_1$, $M = S \oplus (GAP(F_3))$, $F = X(Conv_{1 \times 1}(Per(M)))$.

Where X is an input feature map with a dimension size of (C, H, W);

Fla represents a one-dimensional operation of multi-dimensional data, $D_1$ and $D_2$ represent the dilated convolutions with a convolution kernel size of 3×3, $F_1$ and $F_2$ represent feature maps obtained by the convolution and the one-dimensionalizing, with a dimension of (1, H×W).

Per represents channel rearrangement processing, $F_3$ is a feature map obtained by channel rearrangement processing $F_2$, with a dimension size of (H×W, 1).

$\otimes$ represents tensor multiplication, wherein F3 is multiplied by F1 to obtain S, wherein the dimension size of the feature map S is (H×W, H×W).

GAP represents a global average pooling operation, $\oplus$ represents a tensor addition operation, $Conv_{1 \times 1}$ represents a convolution operation with a convolution kernel size of 1×1, M represents a feature map after multiple processing, with a dimension size of (H×W, 1).

F represents an output feature map with a dimension size of (C, H, W).

Further, the local feature joint learning module comprises an average pooling unit, a spatial dimension segmentation unit and a local feature splicing unit, wherein the average pooling unit is used for performing an average pooling operation on outputs of the third stage and the fourth stage to obtain feature maps corresponding to the third stage and the fourth stage respectively.

The spatial dimension segmentation unit is used for performing spatial dimension segmentation on the feature maps corresponding to the third stage and the fourth stage to obtain local feature blocks corresponding to the third stage and the fourth stage respectively.

The local feature splicing unit is used for splicing the local feature blocks corresponding to the third stage and the fourth stage to obtain a local splicing block.

Further, the loss function training module adopts a cross entropy loss function and a heterogeneous center loss function for training.

Further, the specific expression of the loss function training module is as follows:

$$L_{All} = \sum_{i=1}^{P} L_i,$$

$$L_i = L_{CE} + \lambda L_{HC}.$$

Where $L_{All}$ is an overall training loss function of the loss function training module, $L_i$ is a training loss function corresponding to the ith local splicing block, P is a total number of the local splicing blocks, $L_{CE}$ is the cross entropy loss function, and $L_{HC}$ is the heterogeneous center loss function.

Further, the cross entropy loss function is specifically as follows:

$$L_{CE} = -\sum_{n=1}^{N} \log \frac{e^{W_{y_n}^T x_n + b_{y_n}}}{\sum_{m=1}^{M} e^{W_m^T x_n + b_m}}.$$

where $L_{CE}$ is the cross entropy loss function, N is the number of samples selected for one training, M is a total number of categories, $x_n$ is a feature extracted from the nth sample in category $y_n$ of the training set, $W_{y_n}$ is the weight of the nth sample in category $y_n$, $b_{y_n}$ is the bias of the nth sample in the category $y_n$. $W_m$ is the weight of category m in the training set, and $b_m$ is the bias of the category m.

Further, the heterogeneous center loss function is specifically as follows:

$$L_{HC} = \sum_{a=1}^{M} \left[ \|C_{a,1} - C_{a,2}\|_2^2 \right],$$

$$C_{a,1} = \frac{1}{V} \sum_{b=1}^{V} X_{a,1,b},$$

$$C_{a,2} = \frac{1}{T} \sum_{b=1}^{T} X_{a,2,b}.$$

Where $L_{HC}$ is the heterogeneous center loss function, $C_{a,1}$ and $C_{a,2}$ are feature distribution centers of a visible light modality and an infrared modality in category a, V and T are the number of the RGB images and the number of the infrared images in category a respectively, $X_{a,1,b}$ and $X_{a,2,b}$ are the bth RGB image and infrared image in category a respectively.

Compared with the prior art, the present invention has the following advantages.

1. Based on the dual-stream ResNet50 convolutional neural network architecture, the present invention constructs a cross-modality person re-identification network, which learns and extracts the specific features of RGB images and infrared images respectively, and then learns and extracts the shared features of data of different modalities through local feature joint learning and loss function training, thus reducing the differences between the data of the two modalities of RGB images and infrared images, and improving the identification accuracy of cross-modality person re-identification.

2. The self-attention learning module is embedded in the output of the second stage and the third stage of the double-stream ResNet50 convolutional neural network respectively, and the local area and content information of persons are acquired by using the self-attention learning module, so that the expression ability of specific features in person images of the two modalities is enhanced. Specifically, through dilated convolution, channel rearrangement and batch normalization processing, the discriminative position information in the images of the two modalities is acquired, thus improving the representation ability of specific features in the two modalities and improving the accuracy of subsequent identification results.

3. The third-stage output and the fourth-stage output of the dual-stream ResNet50 convolutional neural network architecture are connected to the local feature joint learning module, and the local feature joint learning module is connected to the loss function training module. The local feature joint learning module is used to splice the middle-level and high-level local features, combined with the middle-level and high-level feature joint learning strategy and the training mode of cross entropy loss and heterogeneous center loss integration. Therefore, it is beneficial to alleviate the loss of discriminative features of target persons, and can not only pay attention to the global information of persons in different modalities, but also enhance the ability to extract local features and enhance the expression of shared features between the two modalities, which is conducive to further improving the identification accuracy of cross-modality person re-identification.

DESCRIPTION OF THE EMBODIMENTS

The present invention will be described in detail with reference to the drawings and specific embodiments.

Embodiments

Figure 1:
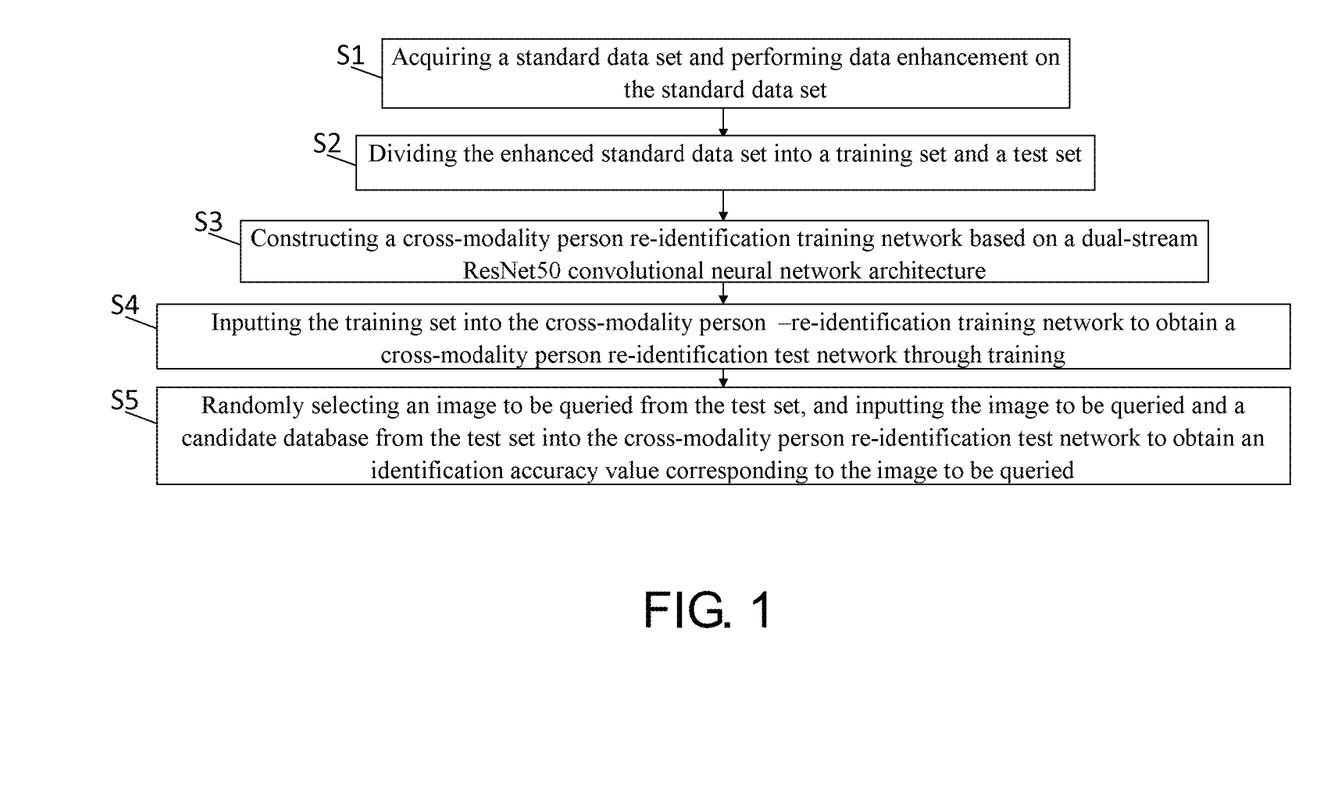
FIG. 1 is a schematic flow diagram of the method of the present invention.

As shown in FIG. 1, a cross-modality person re-identification method based on local information learning, comprising the following steps.

S1: A standard data set is acquired and data enhancement is performed on the standard data set, wherein the standard data set contains a plurality of person categorical data, each comprising a plurality of RGB images and a plurality of infrared images.

Data enhancement is specifically the horizontal flip and random cropping of the image.

S2: The enhanced standard data set is divided into a training set and a test set.

S3: A cross-modality person re-identification training network is constructed based on a dual-stream ResNet50 convolutional neural network architecture, wherein the cross-modality person re-identification training network comprises a self-attention learning module, a local feature joint learning module and a loss function training module that are sequentially connected; specifically, first, the self-attention learning module is embedded in the second-stage output and the third-stage output positions of the dual-stream ResNet50 convolutional neural network architecture; the self-attention learning module is used to extract the position information of RGB images and infrared images and capture local detail features to enhance the specific feature expression of RGB images and infrared images.\

Then, outputs of the third stage and the fourth stage of the dual-stream ResNet50 convolutional neural network architecture are connected to the local feature joint learning module, wherein the local feature joint learning module is used for further capturing the local detail features of the RGB images and the infrared images, so as to perform middle-level and high-level local feature splicing to obtain a local feature splicing block.

Finally, the local feature joint learning module is connected to the loss function training module to train and learn the local feature splicing block with the loss function training module, so as to enhance the shared feature expression of the RGB images and the infrared images, thereby building the cross-modality person re-identification training network.

Figure 2:
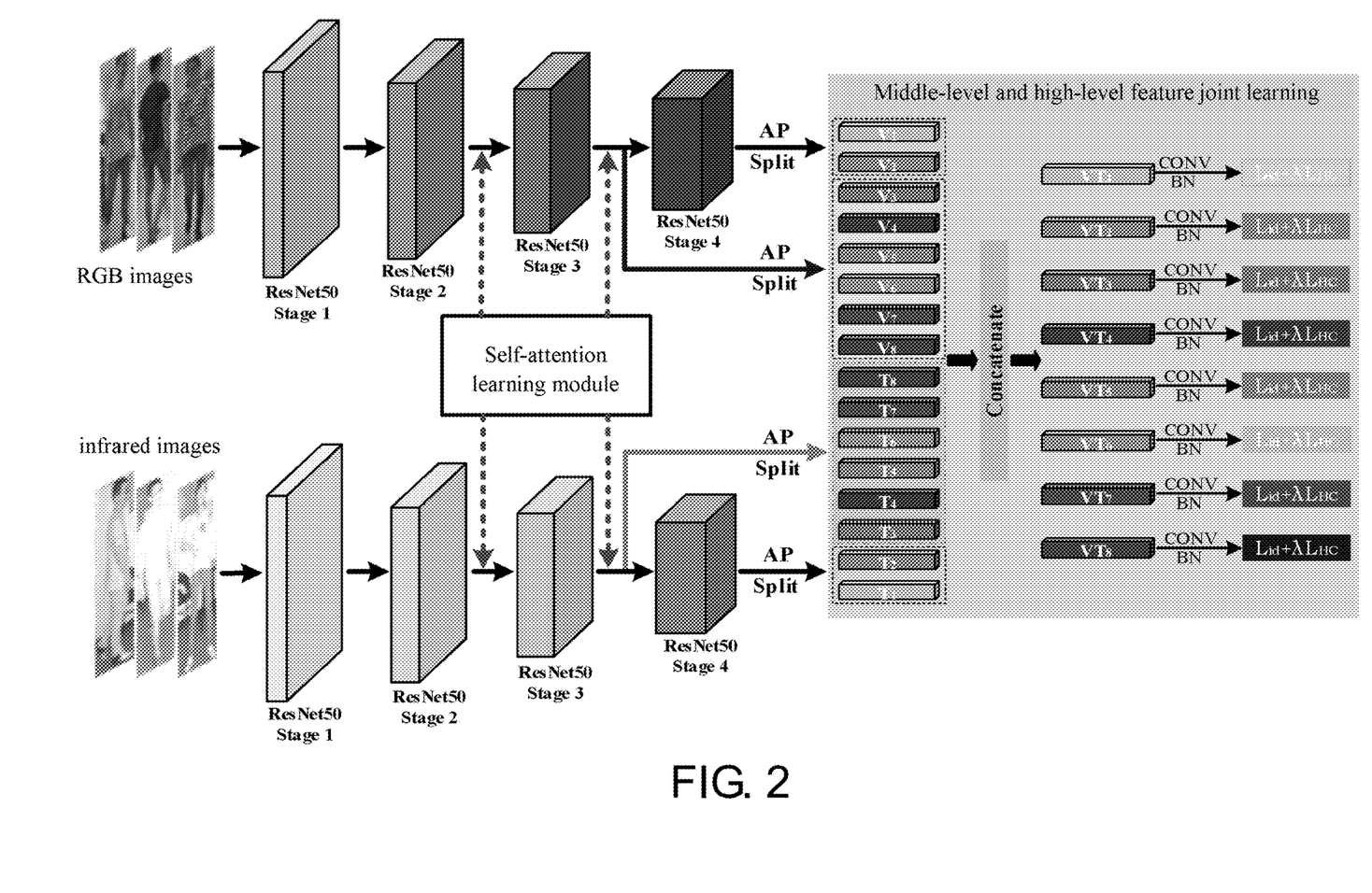
FIG. 2 is a schematic structural diagram of a cross-modality person re-identification test network in an embodiment.

In this embodiment, the cross-modality person re-identification network structure is as shown in FIG. 2. one branch of ResNet50 is used to extract the features of RGB image data, and the other branch is used to extract the features of infrared image data. In the feature extraction process of each branch of ResNet50, self-attention learning module is embedded in Stage 2 and Stage 3, respectively, so as to capture the position features and content information of the images of the two modalities respectively, and enhance the expression ability of their specific features.

Then, average pooling (AP) operation is performed on the feature maps of Stage 3 and Stage 4, and the pooled feature maps are segmented into spatial dimensions. In this embodiment, the feature map of Stage 3 is divided into 6 parts, and the feature map of Stage 4 is divided into 2 parts, and a total of 8 local feature blocks containing visible light features and infrared features are obtained. Finally, the middle-level local features in Stage 3 and the high-level local features in Stage 4 are spliced by using the middle-level and high-level local feature joint learning strategy to obtain local feature splicing blocks.

Finally, the joint training of cross entropy loss and heterogeneous center loss is used to learn and extract the shared features of the data of the two modalities.

S4: The training set is inputted into the cross-modality person re-identification training network to obtain a cross-modality person re-identification test network through training.

S5: An image to be queried is randomly selected from the test set, and the image to be queried and a candidate database from the test set are inputted into the cross-modality person re-identification test network to obtain an identification accuracy value corresponding to the image to be queried. In practical application, learning test is performed according to the set test mode, wherein the test mode includes two types. One of the types: if the image to be queried is RGB image, the images in the candidate database are all infrared images, that is, the infrared images in the candidate database are matched and calculated sequentially with the RGB images to be queried; another one of the types: if the images to be queried are infrared images, all the images in the candidate database are RGB images, that is, the RGB images in the candidate database are matched and calculated sequentially with the infrared images to be queried.

Figure 3:
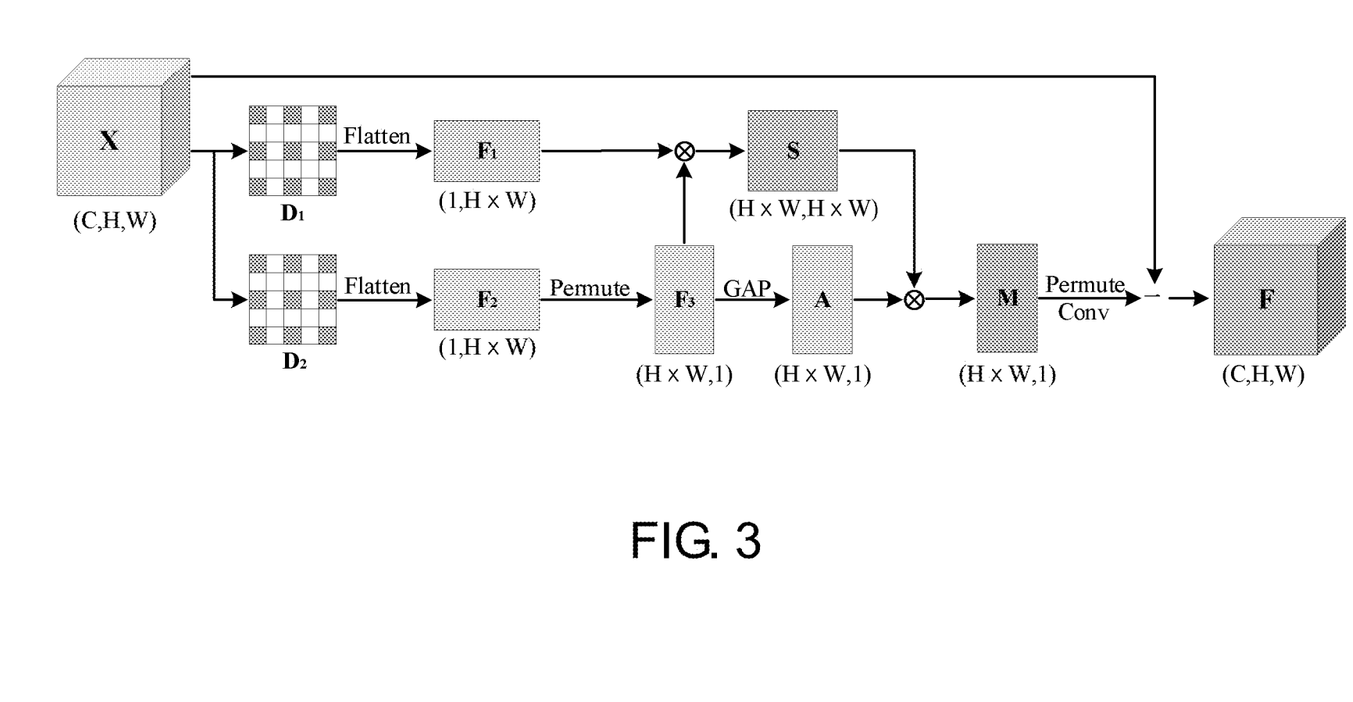
FIG. 3 is a schematic diagram of the working principle of a self-attention learning module.

Specifically, when constructing the cross-modality person re-identification training network in step S3, the self-attention module is composed of three parts, namely, dilated convolution, channel rearrangement and batch normalization processing, which is used to obtain the discriminative position information in the images of the two modalities and improve the representation ability of specific features in the two modalities. The working principle of the self-attention learning module is shown in FIG. 3. Its purpose is to capture local information and long-distance dependencies, and extract the location features and content information of the target person. It includes two dilated convolution layers, namely one 1×1 convolution layer and one global average pooling layer. Firstly, the input feature map with the dimension of (C, H, W) is subjected to two layers of dilated convolution operation:

$$F_1 = Fla(D_1(X)),$$

$$F_2 = Fla(D_2(X)),$$

$$F_3 = Per(F_2).$$

Where $X \in \mathbb{R}^{C*W*H}$, $X \in$, $F_1 \in \mathbb{R}^{1*HW}$, $F_2 \in \mathbb{R}^{1*HW}$, $F_3 \in \mathbb{R}^{HW*1}$; $D_1$ and $D_2$ respectively represent the dilated convolution operation with the size of 3×3, Fla represents a one-dimensional operation of multi-dimensional data, Per represents the channel rearrangement operation.

Then, the long-distance dependencies and local position features of the feature map are obtained by matrix multiplication:

$$S = F_3 \otimes F_1.$$

Where, $\in \mathbb{R}^{HW*HW}$.

GAP operation is performed on the extracted features $F_3$ again, and discriminative information is re-aggregated:

$$M = S \otimes (GAP(F_3)).$$

Finally, the feature map is output:

$$F = X \oplus Conv_{1 \times 1}(Per(M)).$$

Where GAP represents a global average pooling operation, $\oplus$ represents a tensor addition operation, $Conv_{1 \times 1}$ represents a convolution operation with a convolution kernel size of 1×1, M represents a feature map after multiple processing, with a dimension size of (H×W, 1).

Figure 4:
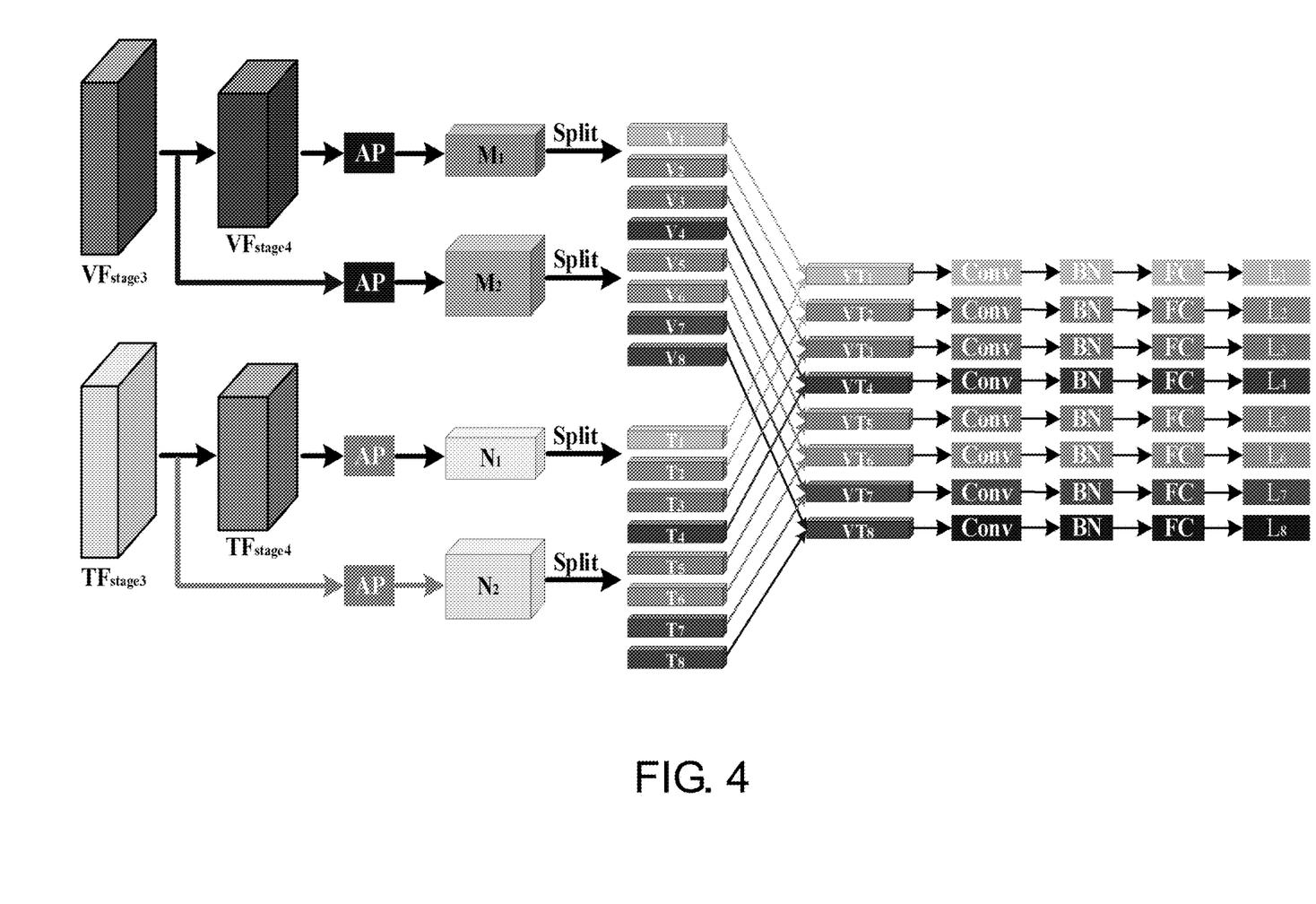
FIG. 4 is a schematic diagram of the working principle of local feature joint learning.

Both the local feature joint learning module and the loss function training module are based on the local feature joint learning strategy. As shown in FIG. 4, the average pooling operation is performed in the third and fourth stages of the dual-stream ResNet50 network, and then the obtained feature map is spatially segmented, and then the dual-stream segmented features are spliced and input into the loss function training module for learning and training, so as to obtain the local and detailed features of the person images of the two modalities and enhance the shared features of the two modalities, thus improving the identification performance and generalization ability of the entire person re-identification network. The loss function training module specifically adopts the cross entropy loss function and the heterogeneous center loss function for joint training, so as to realize the discrimination of inter-class differences and the measurement of intra-class cross-modality similarity as much as possible:

$$L_{All} = \sum_{i=1}^{P} L_i,$$

$$L_i = L_{CE} + \lambda L_{HC}.$$

Where $L_{All}$ is an overall training loss function of the loss function training module, $L_i$ is a training loss function corresponding to the ith local splicing block, P is a total number of the local splicing blocks. In this embodiment, P=8, i∈{1, 2, 3, ..., 8}, $L_{CE}$ is the cross entropy loss function, and $L_{HC}$ is the heterogeneous center loss function.

For the cross entropy loss function, it is the same as the loss function used in general classification tasks:

$$L_{CE} = -\sum_{n=1}^{N} \log \frac{e^{W_{y_n}^T x_n + b_{y_n}}}{\sum_{m=1}^{M} e^{W_m^T x_n + b_m}}.$$

Where $L_{CE}$ is the cross entropy loss function, N is the number of samples selected for one training, M is a total number of categories, $x_n$ is a feature extracted from the nth sample in category $y_n$ of the training set, $W_{y_n}$ is the weight of the nth sample in category $y_n$, $b_{y_n}$ is the bias of the nth sample in the category $y_n$, $W_m$ is the weight of category m in the training set, and $b_m$ is the bias of the category m.

For the heterogeneous center loss function, the network is supervised to learn cross-modality information by constraining the intra-class center distance between two heterogeneous modalities:

$$L_{HC} = \sum_{a=1}^{M} \left[ \| C_{a,1} - C_{a,2} \|_2^2 \right],$$

$$C_{a,1} = \frac{1}{V} \sum_{b=1}^{V} X_{a,1,b},$$

$$C_{a,2} = \frac{1}{T} \sum_{b=1}^{T} X_{a,2,b}.$$

Where $L_{HC}$ is the heterogeneous center loss function, $C_{a,1}$ and $C_{a,2}$ are feature distribution centers of a visible light modality and an infrared modality in category a, V and T are the number of the RGB images and the number of the infrared images in category a respectively, $X_{a,1,b}$ and $X_{a,2,b}$ are the bth RGB image and infrared image in category a respectively.

In this embodiment, the training parameters in the network training process include: the total training cycle (epoch) is set to 60, the batch size is set to 64, and the learning rate update mode is:

$$lr(t) = \begin{cases} 0.01 & \text{if } t \leq 30 \\ 0.001 & \text{if } 30 < t \leq 60 \end{cases}.$$

Using the method provided by the present invention, this embodiment is compared with other identification methods on the RegDB cross-modality data set, and the corresponding identification results obtained are shown in Table 1.

TABLE 1

| Method type | Visible to Thermal | | | | Thermal to Visible | | | |
|---|---|---|---|---|---|---|---|---|
| | R-1 | R-10 | R-20 | mAP | R-1 | R-10 | R-20 | mAP |
| eBDTR | 34.62 | 58.96 | 68.72 | 33.46 | 34.21 | 58.74 | 68.64 | 32.49 |
| D-HSME | 50.85 | 73.36 | 81.66 | 47.00 | 50.15 | 72.40 | 81.07 | 46.16 |
| D²RL | 43.40 | 66.10 | 76.30 | 44.10 | — | — | — | — |
| MAC | 36.43 | 62.36 | 71.63 | 37.03 | 36.20 | 61.68 | 70.99 | 36.63 |
| DFE | 70.13 | 86.32 | 91.96 | 69.14 | 67.99 | 85.56 | 91.41 | 66.70 |
| MSR | 48.43 | 70.32 | 79.95 | 48.67 | — | — | — | — |
| AlignGAN | 57.90 | — | — | 53.60 | 56.30 | — | — | 53.40 |
| JSIA | 48.10 | — | — | 48.90 | 48.5 | — | — | 49.3 |
| XIV | 62.21 | 83.13 | 91.72 | 6018 | — | — | — | — |
| EDTR | 52.58 | 72.10 | 81.47 | 52.98 | 51.89 | 72.09 | 81.04 | 52.13 |
| MACE | 72.37 | 88.40 | 93.59 | 69.09 | 72.12 | 88.07 | 93.07 | 68.57 |
| HAT | 71.83 | 87.16 | 92.16 | 67.56 | 70.02 | 86.45 | 91.61 | 66.30 |
| DDAG | 69.34 | 86.19 | 91.49 | 63.46 | 68.06 | 85.15 | 90.31 | 61.80 |
| Hi-CMD | 70.93 | 86.39 | — | 66.04 | — | — | — | — |
| cm-SSFT | 72.3 | — | — | 72.9 | 71.0 | — | — | 71.7 |
| DG-VAE | 72.97 | 86.89 | — | 71.78 | — | — | — | — |
| SIM | 74.47 | — | — | 75.29 | 75.24 | — | — | 78.30 |
| MPMN | 86.56 | 96.68 | 98.28 | 82.91 | 84.62 | 95.51 | 97.33 | 79.49 |
| The present invention | 92.77 | 98.16 | 99.42 | 83.06 | 91.65 | 98.74 | 99.42 | 81.62 |

In Table 1, Visible to Thermal indicates that the images to be queried are RGB images, and the images of candidate databases are all infrared images. Thermal to Visible indicates that the image to be queried is an infrared image, and the images of the candidate database are RGB images. From the data in Table 1, it can be seen that the Rank-1 accuracy value and mAP value of the person re-identification method provided by the present invention are better than other existing identification methods, indicating that the present invention can not only pay attention to the global information of persons in different modalities, but also enhance the ability to extract local features and enhance the expression of specific features and shared features of the two modalities, thus improving the identification accuracy of cross-modality person re-identification.

In conclusion, in the present invention, the key point of solving cross-modality person re-identification is considered to lie in feature extraction and metric learning, and how to effectively extract discriminative and fine specific features and shared features between images of different modalities becomes the key and difficult point of cross-modality person re-identification technology, so a cross-modality person re-identification method based on local information learning is proposed. By integrating self-attention and local feature joint learning, a simple and effective self-attention learning module is designed, which can learn the discriminative position features and content information in images of the two modalities through the sampling mechanism of large receptive field, thus enhancing the expression ability of specific features and improving the identification performance of cross-modality person re-identification.

The middle-level and high-level feature joint learning strategy is adopted, which pays attention to the importance of features in each stage in the backbone network, and is beneficial to alleviate the loss of discriminative features of target persons. In the training or learning process, the present invention adopts the middle-level and high-level local feature joint training strategy, which can not only pay attention to the global information of persons in different modalities, but also enhance the ability to extract local features and enhance the expression of shared features of the two modalities, thus it is beneficial to improving the identification performance of cross-modality person re-identification.

Compared with the prior art, the present invention enables to reduce the difference between RGB and infrared modalities and improve the identification accuracy of cross-modality person re-identification by effectively extracting the specific features between images of different modalities and performing middle-level and high-level feature joint learning on the specific features to obtain shared features.

What is claimed is:

1. A cross-modality person re-identification method based on local information learning, comprising following steps:
   S1: acquiring a standard data set and performing data enhancement on the standard data set, wherein the standard data set contains a plurality of person categorical data, each comprising a plurality of RGB images and a plurality of infrared images;
   S2: dividing the enhanced standard data set into a training set and a test set;
   S3: constructing a cross-modality person re-identification training network based on a dual-stream ResNet50 convolutional neural network architecture, wherein the cross-modality person re-identification training network comprises a self-attention learning module, a local feature joint learning module and a loss function training module that are sequentially connected;
   S4: inputting the training set into the cross-modality person re-identification training network to obtain a cross-modality person re-identification test network through training; and
   S5: randomly selecting an image to be queried from the test set, and inputting the image to be queried and a candidate database from the test set into the cross-modality person re-identification test network to obtain an identification accuracy value corresponding to the image to be queried,
   wherein he step S3 specifically comprises the following steps:
   S31: embedding the self-attention learning module in outputs of a second stage and a third stage of the dual-stream ResNet50 convolutional neural network architecture;
   S32: connecting outputs of the third stage and a fourth stage of the dual-stream ResNet50 convolutional neural network architecture to the local feature joint learning module; and
   S33: connecting the local feature joint learning module to the loss function training module.

2. The cross-modality person re-identification method based on local information learning according to claim 1, wherein the data enhancement in the step S1 is specifically performing horizontally flipping and randomly cropping on an image sequentially.

3. The cross-modality person re-identification method based on local information learning according to claim 1, wherein
   the self-attention learning module is used for extracting position information of the RGB images and the infrared images and capturing local detail features, so as to enhance specific feature expression of the RGB images and the infrared images respectively;
   the local feature joint learning module is used for further capturing the local detail features of the RGB images and the infrared images, so as to perform middle-level and high-level local feature splicing to obtain a local feature splicing block;
   the loss function training module is used to train and learn the local feature splicing block, so as to enhance a shared feature expression of the RGB images and the infrared images, thereby building the cross-modality person re-identification training network.

4. The cross-modality person re-identification method based on local information learning according to claim 1, wherein the self-attention learning module comprises a dilated convolution unit, a channel rearrangement unit and a batch normalization processing unit.

5. The cross-modality person re-identification method based on local information learning according to claim 4, wherein the specific feature expression of the self-attention learning module is as follows:

$$F_1 = Fla(D_1(X)),$$

$$F_2 = Fla(D_2(X)),$$

$$F_3 = Per(F_2),$$

$$S = F_3 \otimes F_1,$$

$$M = S \oplus (GAP(F_3)),$$

$$F = X(Conv_{1\times 1}(Per(M))),$$

where X is an input feature map with a dimension size of (C, H, W);

Fla represents a one-dimensional operation of multi-dimensional data, $D_1$ and $D_2$ represent dilated convolutions with a convolution kernel size of 3×3, $F_1$ and $F_2$ represent feature maps obtained by the convolution and the one-dimensionalizing, with a dimension of (1, H×W);

Per represents channel rearrangement processing, $F_3$ is a feature map obtained by channel rearrangement processing $F_2$, with a dimension size of (H×W, 1);

⊗ represents tensor multiplication, wherein $F_3$ is multiplied by $F_1$ to obtain S, wherein a dimension size of the feature map S is (H×W, H×W);

GAP represents a global average pooling operation, ⊕ represents a tensor addition operation, $Conv_{1\times 1}$ represents a convolution operation with a convolution kernel size of 1×1, M represents a feature map after multiple processing, with a dimension size of (H×W, 1);

F represents an output feature map with a dimension size of (C, H, W).

6. The cross-modality person re-identification method based on local information learning according to claim 3, wherein the local feature joint learning module comprises an average pooling unit, a spatial dimension segmentation unit and a local feature splicing unit, wherein the average pooling unit is used for performing an average pooling operation on outputs of the third stage and the fourth stage to obtain feature maps corresponding to the third stage and the fourth stage respectively;

the spatial dimension segmentation unit is used for performing spatial dimension segmentation on the feature maps corresponding to the third stage and the fourth stage to obtain local feature blocks corresponding to the third stage and the fourth stage respectively;

the local feature splicing unit is used for splicing the local feature blocks corresponding to the third stage and the fourth stage to obtain a local splicing block.

7. The cross-modality person re-identification method based on local information learning according to claim 6, wherein the loss function training module adopts a cross entropy loss function and a heterogeneous center loss function for training.

8. The cross-modality person re-identification method based on local information learning according to claim 7, wherein the specific feature expression of the loss function training module is as follows:

$L_{All} = \sum_{i=1}^{P} L_i$, $L_i = L_{CE} + \lambda L_{HC}$, where $L_{All}$ is an overall training loss function of the loss function training module, $L_i$ is a training loss function corresponding to the ith local splicing block, P is a total number of the local splicing blocks, $L_{CE}$ is the cross entropy loss function, and $L_{HC}$ is the heterogeneous center loss function.

9. The cross-modality person re-identification method based on local information learning according to claim 8, wherein the cross entropy loss function is specifically as follows:

$$L_{CE} = -\sum_{n=1}^{N} \log \frac{e^{W_{y_n}^T x_n + b_{y_n}}}{\sum_{m=1}^{M} e^{W_m^T x_n + b_m}},$$

where $L_{CE}$ is the cross entropy loss function, N is the number of samples selected for one training, M is a total number of categories, $x_n$ is a feature extracted from the nth sample in category yn of the training set, $W_{y_n}$ is the weight of the nth sample in category $y_n$, $b_{y_n}$ is the bias of the nth sample in the category $y_n$, $W_m$ is the weight of category m in the training set, and $b_m$ is the bias of the category m.

10. The cross-modality person re-identification method based on local information learning according to claim 8, wherein the heterogeneous center loss function is specifically as follows:

$$L_{HC} = \sum_{a=1}^{M} \left[ \|C_{a,1} - C_{a,2}\|_2^2 \right],$$

$$C_{a,1} = \frac{1}{V} \sum_{b=1}^{V} X_{a,1,b},$$

$$C_{a,2} = \frac{1}{T} \sum_{b=1}^{T} X_{a,2,b},$$

where $L_{HC}$ is the heterogeneous center loss function, $C_{a,1}$ and $C_{a,2}$ are feature distribution centers of a visible light modality and an infrared modality in category a, V and T are the number of the RGB images and the number of the infrared images in category a respectively, $X_{a,1,b}$ and $X_{a,2,b}$ are the bth RGB image and infrared image in category a respectively.

* * * * *